United States Patent
Andersson et al.

(10) Patent No.: US 12,089,216 B2
(45) Date of Patent: Sep. 10, 2024

(54) UPLINK CONTROL INFORMATION HANDLING FOR SUB-SLOTS

(71) Applicant: Telefonaktiebolaget LM Ericsson (publ), Stockholm (SE)

(72) Inventors: Mattias Andersson, Sundbyberg (SE); Sorour Falahati, Stockholm (SE); Ali Behravan, Stockholm (SE); Kittipong Kittichokechai, Järfälla (SE); Yufei Blankenship, Kildeer, IL (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 350 days.

(21) Appl. No.: 17/608,279

(22) PCT Filed: May 4, 2020

(86) PCT No.: PCT/EP2020/062293
§ 371 (c)(1),
(2) Date: Nov. 2, 2021

(87) PCT Pub. No.: WO2020/225198
PCT Pub. Date: Nov. 12, 2020

(65) Prior Publication Data
US 2022/0248395 A1 Aug. 4, 2022

Related U.S. Application Data

(60) Provisional application No. 62/843,161, filed on May 3, 2019.

(51) Int. Cl.
*H04W 72/21* (2023.01)
*H04W 72/0446* (2023.01)

(52) U.S. Cl.
CPC ....... *H04W 72/21* (2023.01); *H04W 72/0446* (2013.01)

(58) Field of Classification Search
CPC .............. H04W 72/21; H04W 72/0446; H04L 5/0007; H04L 5/0055; H04L 5/0094; H04L 5/0053; H04L 1/1854; H04L 1/1861
See application file for complete search history.

(56) References Cited

U.S. PATENT DOCUMENTS

| | | | |
|---|---|---|---|
| 2020/0145988 A1* | 5/2020 | Seo | H04L 1/1861 |
| 2021/0058197 A1* | 2/2021 | Gao | H04L 1/1896 |

(Continued)

FOREIGN PATENT DOCUMENTS

| | | |
|---|---|---|
| CN | 109548409 A | 3/2019 |
| WO | 2020145356 A1 | 7/2020 |

OTHER PUBLICATIONS

International Search Report and Written Opinion dated Aug. 4, 2020 for International Application No. PCT/EP2020/062293 filed May 4, 2020, consisting of 10-pages.

(Continued)

*Primary Examiner* — Will W Lin
(74) *Attorney, Agent, or Firm* — Weisberg I.P. Law, P.A.

(57) ABSTRACT

A method, network node and wireless device for scheduling PUCCH transmissions that are longer than a subslot such that no different PUCCH transmissions overlap in time are disclosed. According to one aspect, a method in a network node includes scheduling physical uplink control channel (PUCCH) transmissions on a per sub-slot basis. The method further includes transmitting to a wireless device (WD) on a per sub-slot basis a physical downlink channel having an indication of a sub-slot to transmit a PUCCH transmission according to the schedule.

20 Claims, 11 Drawing Sheets

(56) References Cited

U.S. PATENT DOCUMENTS

| | | | | |
|---|---|---|---|---|
| 2021/0306107 A1* | 9/2021 | Yin | .................... | H04W 72/23 |
| 2021/0368528 A1* | 11/2021 | Yoshimura | ............ | H04L 1/1671 |
| 2022/0014314 A1* | 1/2022 | Wang | ................ | H04W 72/1268 |

OTHER PUBLICATIONS

3GPP TSG RAN WG1 #96bis R1-1904958; Title: UCI enhancements for URLLC; Agenda Item: 7.2.6.2; Source: NTT Docomo, Inc.: Document for: Discussion and Decision; Date and Location: Apr. 8-12, 2019, Xi'an, China, consisting of 12-pages.

3GPP TSG RAN WG1 #96bis R1-1905716; Title: Summary on UCI enhancements for URLLC; Agenda Item: 7.2.6.2; Source: OPPO: Document for: Discussion and Decision; Date and Location: Apr. 8-12, 2019, Xi'an, China, consisting of 10-pages.

Chinese Office Action with English summary translation dated Feb. 23, 2024 for Patent Application No. 202080047948.6, consisting of 8 pages.

3GPP TSG RAN WG1 #96bis R1-1904223; Title: UCI enhancements for NR URLLC; Agenda Item: 7.2.6.2; Source:NEC; Document for: Discussion/Decision; Date and Location: Apr. 8-12, 2019, Xi'an, China, consisting of 7 pages.

* cited by examiner

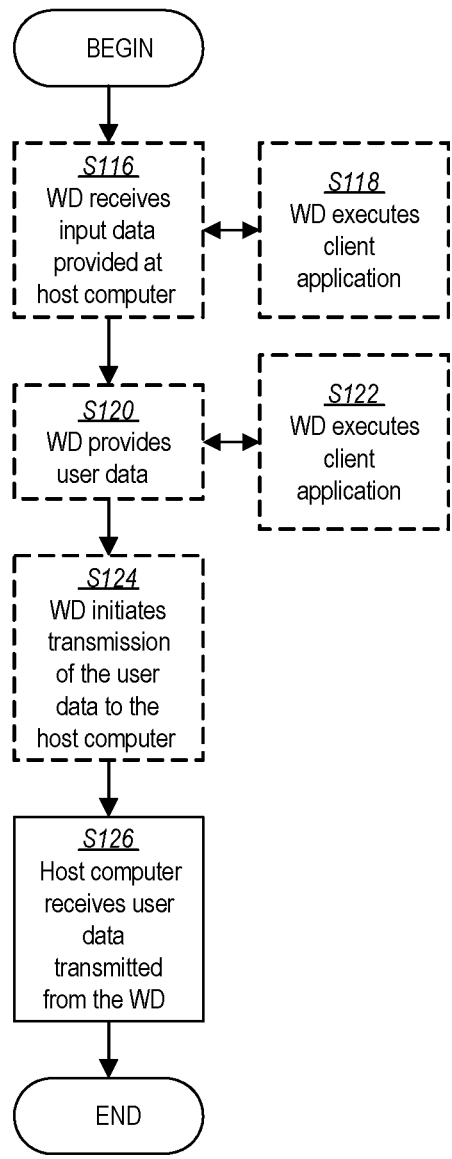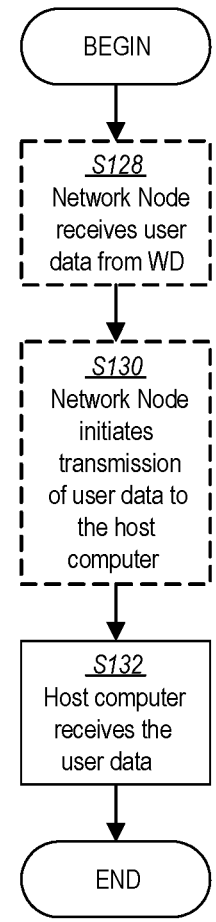
FIG. 7
FIG. 8

UPLINK CONTROL INFORMATION HANDLING FOR SUB-SLOTS

CROSS-REFERENCE TO RELATED APPLICATIONS

This application is a Submission Under 35 U.S.C. § 371 for U.S. National Stage Patent Application of International Application No.: PCT/EP2020/062293, filed May 4, 2020 entitled "UPLINK CONTROL INFORMATION HANDLING FOR SUB-SLOTS," which claims priority to U.S. Provisional Application No. 62/843,161, filed May 3, 2019, entitled "UPLINK CONTROL INFORMATION HANDLING FOR SUB-SLOTS" the entireties of both of which are incorporated herein by reference.

FIELD

The present disclosure relates to wireless communications, and in particular, to uplink control information (UCI) handling for sub-slots.

BACKGROUND

The New Radio (NR) (also referred to as "5G") standard of the Third Generation Partnership Project (3GPP) is designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission for possibly moderate data rates.

One of the solutions for low latency data transmission is shorter transmission time intervals. In NR, in addition to transmission in a slot, a mini-slot transmission is also allowed to reduce latency. FIG. 1 is a diagram showing a plurality of resource elements for NR transmission. A mini-slot can consist of 2, 4 or 7 orthogonal frequency division multiplexed (OFDM) symbols, while in the uplink (UL) a mini-slot can be any number of 1 to 14 OFDM symbols. It should be noted that the concepts of slot and mini-slot are not specific to a specific service meaning that a mini-slot may be used for either eMBB, URLLC, or other services.

Downlink Control Information

In the 3GPP NR standard, downlink control information (DCI), which is transmitted in the physical downlink control channel (PDCCH), is used to indicate the downlink (DL) data related information, UL related information, power control information, slot format indication, etc. There are different formats of DCI associated with each of these control signals and the wireless device (WD) identifies them based on different radio network temporary identifiers (RNTIs).

A WD is configured by higher layer signaling to monitor for DCIs in different resources with different periodicities, etc. DCI formats 1_0 and 1_1 are used for scheduling downlink (DL) data which is sent in the physical downlink shared channel (PDSCH), and includes time and frequency resources for DL transmission, as well as modulation and coding information, HARQ (hybrid automatic repeat request) information, etc.

HARQ Feedback

The procedure for receiving downlink transmission is that the WD first monitors and decodes a PDDCH in slot "n" which points to a DL data scheduled in slot n+K0 slots, where K0 is larger than or equal to 0. The WD then decodes the data in the corresponding PDSCH. Finally, based on the outcome of the decoding the WD sends an acknowledgement of the correct decoding (ACK) or a negative acknowledgement (NACK) to the base station (gNB, also referred to herein as a network node) at time slot n+K0+K1 (where in case of slot aggregation, n+K0 would be replaced by the slot where PDSCH ends). Both of K0 and K1 are indicated in the downlink DCI. The resources for sending the acknowledgement are indicated by the physical uplink control channel (PUCCH) resource indicator (PRI) field in the PDCCH which points to one of the PUCCH resources that is configured by higher layers.

Depending on DL/UL slot configurations, or whether carrier aggregation or per code-block group (CBG) transmission is used in the DL, the feedback for several PDSCHs may need to be multiplexed in one feedback. This is done by constructing HARQ-ACK codebooks. In NR, the WD can be configured to multiplex the ACK/NACK (A/N) bits using a semi-static codebook or a dynamic codebook.

A Type 1, or semi-static codebook, has a bit sequence where each element contains the A/N bit from a possible allocation in a certain slot, carrier, or transport block (TB). When the WD is configured with code block group (CBG) and/or time-domain resource allocation (TDRA) tables with multiple entries, multiple bits are generated per slot and per transport block (TB). It is important to note that the codebook is derived regardless of the actual PDSCH scheduling. The size and format of the semi-static codebook is preconfigured based on the mentioned parameters. A drawback of a semi-static HARQ ACK codebook is that the size is fixed, regardless of whether there is a transmission or whether no bit is reserved in the feedback matrix.

In cases where a WD has a TDRA table with multiple time-domain resource allocation entries configured: The table may be pruned (i.e., entries may be removed based on a specified algorithm) to derive a TDRA table that only contains non-overlapping time-domain allocations. One bit is then reserved in the HARQ code block (CB) for each non-overlapping entry (assuming a WD is capable of supporting reception of multiple PDSCHs in a slot).

To avoid reserving unnecessary bits in a semi-static HARQ codebook, in NR, a WD can be configured to use a type 2, or dynamic HARQ codebook, where an A/N bit is present only if there is a corresponding transmission scheduled. To avoid any confusion between the gNB and the WD about the number of PDSCHs that the WD should send feedback for, a counter downlink assignment indicator (DAI) field exists in a DL assignment. The DAI field denotes the cumulative number of (serving cell, PDCCH occasion) pairs in which a PDSCH is scheduled to a WD up to the current PDCCH. In addition, there is another field called total DAI which, when present, gives the total number of all PDCCHs of the current PDCCH monitoring occasion. The timing for sending HARQ feedback is determined based on both PDSCH transmission slot with reference to the PDCCH slot (K0) and the PUCCH slot that contains HARQ feedback (K1).

FIG. 2 illustrates the timeline in a scenario with two PDSCHs and one feedback. In this example, there is a total of 4 PUCCH resources configured, and the physical resource indicator (PRI) indicates PUCCH 2 to be used for HARQ feedback. The following explains how PUCCH 2 is selected from 4 PUCCH resources based on the procedure in 3GPP Rel-15.

In NR 3GPP Rel-15, a WD can be configured with a maximum of 4 PUCCH resource sets for transmission of HARQ-ACK information. Each set is associated with a range of uplink control information (UCI) payload bits including HARQ-ACK bits. The first PUCCH resource set is always associated to 1 or 2 HARQ-ACK bits and hence, includes only PUCCH format 0 or 1 or both. The range of payload values (minimum to maximum values) for other PUCCH resource sets, if configured, is provided by configuration, except for the maximum value for the last PUCCH resource set where a default value is used, and the minimum value of the second set which is 3. The first PUCCH resource set can include a maximum 32 PUCCH resources of format 0 or 1. Other sets can include a maximum of 8 bits of format 2 or 3 or 4.

As described previously, the WD can determine a slot for transmission of HARQ-ACK bits in a PUCCH corresponding to PDSCHs scheduled or activated by DCI via the K1 value provided by configuration or a field in the corresponding DCI. The WD forms a codebook from the HARQ-ACK bits with associated PUCCH in a same slot via corresponding K1 values. The WD can determine a PUCCH resource set for which the size of the codebook is within the corresponding range of payload values associated to that set. Also, the WD can determine a PUCCH resource in that set, if the set is configured with maximum 8 PUCCH resources, by a field in the last DCI associated to the corresponding PDSCHs. If the set is the first set and is configured with more than 8 resources, a PUCCH resource in that set is determined by a field in the last DCI associated to the corresponding PDSCHs and implicit rules based on the control channel element (CCE).

A PUCCH resource for HARQ-ACK transmission can overlap in time with other PUCCH resources for channel state information (CSI) and/or scheduling request (SR) transmissions as well as PUSCH transmissions in a slot. In case of overlapping PUCCH and/or PUSCH resources, the WD first resolves overlapping PUCCH resources, if any, by determining a PUCCH resource carrying the total UCI (including HARQ-ACK bits) such that the UCI multiplexing timeline requirements are met. There might be partial or complete dropping of CSI bits, if any, to multiplex the UCI in the determined PUCCH resource. Then, the WD resolves overlapping of PUCCH and PUSCH resources, if any, by multiplexing the UCI on the PUSCH resource if the timeline requirements for UCI multiplexing are met The following has been considered by the 3GPP:
Considerations:
For supporting multiple PUCCHs for HARQ-ACK within a slot for constructing the HARQ-ACK codebook, support sub-slot-based HARQ-ACK feedback procedure:
  An uplink (UL) slot consists of a number of sub-slots. No more than one transmitted PUCCH carrying HARQ-ACKs starts in a sub-slot;
  PDSCH transmission is not subject to sub-slot restrictions (if any);
  For Future Study (FFS): PDSCH-to-sub-slot association; and
  For Future Study (FFS): Allowing PUCCH across sub-slot boundary or not; and
  R15 HARQ-codebook construction is applied in units of sub-slots at least for Type II HARQ-ACK codebook: FFS for Type I HARQ-ACK codebook;
  Rel-15 PUCCH resource overriding procedures is applied in unit of sub-slot;
  Number or length of UL sub-slots in a slot is WD-specific and semi-statically configured.
  FFS: Limit of number of PUCCH transmissions carrying HARQ-ACKs in a slot;
  FFS: K1 definition; and
  FFS: Details of PUCCH resource configuration and determination.
  FFS: Use "Codebook-less HARQ" as a complementary or not.
  FFS: If HARQ-ACK can be omitted in case latency requirement cannot be met.
  FFS: PDSCH groupings and PHY identification for separate HARQ-ACK constructions for different service types.

For supporting multiple PUCCHs for HARQ-ACK within a slot for constructing the HARQ-ACK codebook, K1 is defined following the R15 approach but in units of sub-slots.

When at least two HARQ-ACK codebooks are simultaneously constructed for supporting different service types for a WD, for both Type I (if supported) and Type II HARQ-ACK codebooks (if supported), and for dynamically-scheduled PDSCH, the WD may down-select from below for the PHY identification for identifying a HARQ-ACK codebook:
  Opt. 1: By DCI format;
  Opt. 2: By RNTI;
  Opt. 3: By explicit indication in DCI (FFS: new field or reuse existing field);
  Opt. 4: By CORESET/search space;
  FFS additional option(s) for Type I HARQ-ACK codebook; and
  FFS: For SPS PDSCH (including SPS release PDCCH).

A problem exists with supporting PUCCH transmissions that cross the sub-slot boundary.

SUMMARY

Some embodiments advantageously provide methods, network nodes and wireless devices for uplink control information (UCI) handling for sub-slots. For example, it is noted that constraining a PUCCH transmission to be contained within a sub-slot reduces coverage compared to allowing longer PUCCH transmissions.

Some embodiments allow a PUCCH resource associated with a sub-slot to be transmitted partially or fully in later sub-slots. Some embodiments are governed by rules for handling UCI collisions when different PUCCH transmissions overlap in time. Some embodiments allow for sub-slot PUCCH transmissions spanning more than one sub-slot.

According to one aspect, a network node configured to communicate with a wireless device (WD) is provided. The network node includes processing circuitry configured to schedule physical uplink control channel, PUCCH, transmissions on a per sub-slot basis. The network node further includes a radio interface in communication with the processing circuitry, the radio interface configured to transmit to the WD on a per sub-slot basis a physical downlink channel having an indication of a sub-slot to transmit a PUCCH transmission according to the schedule.

According to this aspect, in some embodiments, the network node further configures the WD with a common PUCCH resource set for sub-slots in a slot. In some embodiments, the network node further configures the WD with a different PUCCH resource set for each sub-slot in a slot. In some embodiments, a physical downlink channel transmission includes a K1 value for each sub-slot, the K1 value indicating a number of sub-slots until transmission of a corresponding PUCCH. In some embodiments, multiple sub-slots within a slot provide a K1 value indicating a number of slots until transmission of a same PUCCH in a sub-slot. In some embodiments, the scheduling is performed to prevent a PUCCH resource associated with a sub-slot from occupying orthogonal frequency division multiplexed, OFDM, symbols in an earlier sub-slot.

According to another aspect, a method in a network node configured to communicate with a wireless device (WD) is provided. The method includes scheduling physical uplink control channel, PUCCH, transmissions on a per sub-slot basis, and transmitting to the WD on a per sub-slot basis a physical downlink channel having an indication of a sub-slot to transmit a PUCCH transmission according to the schedule.

According to this aspect, in some embodiments, the method further includes configuring the WD with a common PUCCH resource set for sub-slots in a slot. In some embodiments, the method further includes configuring the WD with a different PUCCH resource set for each sub-slot in a slot. In some embodiments, a physical downlink channel transmission includes a K1 value for each sub-slot, the K1 value indicating a number of sub-slots until transmission of a corresponding PUCCH. In some embodiments, multiple sub-slots within a slot provide a K1 value indicating a number of slots until transmission of a same PUCCH in a sub-slot. In some embodiments, the scheduling is performed to prevent a PUCCH resource associated with a sub-slot from occupying orthogonal frequency division multiplexed, OFDM, symbols in an earlier sub-slot.

According to yet another aspect, a WD configured to communicate with a network node is provided. The WD includes a radio interface configured to receive an indication of a sub-slot to transmit a physical uplink control channel, PUCCH, transmission. The WD also includes a processing circuitry in communication with the radio interface, the processing circuitry configured to schedule the PUCCH transmission in the indicated sub-slot.

According to this aspect, in some embodiments, a PUCCH transmission is one of dropped and postponed if the PUCCH transmission overlaps in time with another PUCCH transmission. In some embodiments, a PUCCH transmission is one of dropped and postponed based at least in part on a priority of the PUCCH transmission. In some embodiments, the processing circuitry is further configured to, when two PUCCH transmissions overlap in time, multiplex hybrid automatic repeat request, HARQ, bits and schedule the HARQ bits for transmission in a later of the two PUCCH transmissions. In some embodiments, the multiplexing is performed only when enough time exists between a start of an earlier of the two PUCCH transmissions and reception of an indication that triggers the later of the two PUCCH transmissions. In some embodiments, the multiplexing is performed only when the two PUCCH transmissions have a same priority. In some embodiments, the multiplexing is performed only when the two PUCCH transmissions are scheduled with a same type of K1 value indicating a sub-slot for PUCCH transmission. In some embodiments, a PUCCH resource is considered invalid when an occupied orthogonal frequency division multiplexed (OFDM) symbol of the PUCCH resource spans more than one slot. In some embodiments, a PUCCH resource whose orthogonal frequency division multiplexed (OFDM) symbol spans more than one slot is truncated in time. In some embodiments, a starting symbol of a PUCCH resource in a slot is given by a starting symbol configured in the PUCCH resource plus a starting symbol in the slot of the sub-slot for which the PUCCH resource is configured. In some embodiments, a starting symbol of a PUCCH resource in a slot is given by a starting symbol configured in the PUCCH resource plus a starting symbol in the slot of the sub-slot with which the PUCCH transmission is associated.

According to another aspect, a method in a wireless device (WD) configured to communicate with a network node is provided. The method includes receiving an indication of a sub-slot to transmit a physical uplink control channel, PUCCH, transmission, and scheduling the PUCCH transmission in the indicated sub-slot.

According to this aspect, in some embodiments, a PUCCH transmission is one of dropped and postponed if the PUCCH transmission overlaps in time with another PUCCH transmission. In some embodiments, a PUCCH transmission is one of dropped and postponed based at least in part on a priority of the PUCCH transmission. In some embodiments, the method further includes, when two PUCCH transmissions overlap in time, multiplexing hybrid automatic repeat request, HARQ, bits and schedule the HARQ bits for transmission in a later of the two PUCCH transmissions. In some embodiments, the multiplexing is performed only when enough time exists between a start of an earlier of the two PUCCH transmissions and reception of an indication that triggers the later of the two PUCCH transmissions. In some embodiments, the multiplexing is performed only when the two PUCCH transmissions have a same priority. In some embodiments, the multiplexing is performed only when the two PUCCH transmissions are scheduled with a same type of K1 value indicating a sub-slot for PUCCH transmission. In some embodiments, a PUCCH resource is considered invalid when an occupied orthogonal frequency division multiplexed (OFDM) symbol of the PUCCH resource spans more than one slot. In some embodiments, a PUCCH resource whose orthogonal frequency division multiplexed (OFDM) symbol spans more than one slot is truncated in time. In some embodiments, a starting symbol of a PUCCH resource in a slot is given by a starting symbol configured in the PUCCH resource plus a starting symbol in the slot of the sub-slot for which the PUCCH resource is configured. In some embodiments, a starting symbol of a PUCCH resource in a slot is given by a starting symbol configured in the PUCCH resource plus a starting symbol in the slot of the sub-slot with which the PUCCH transmission is associated.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

DETAILED DESCRIPTION

Figure 1:
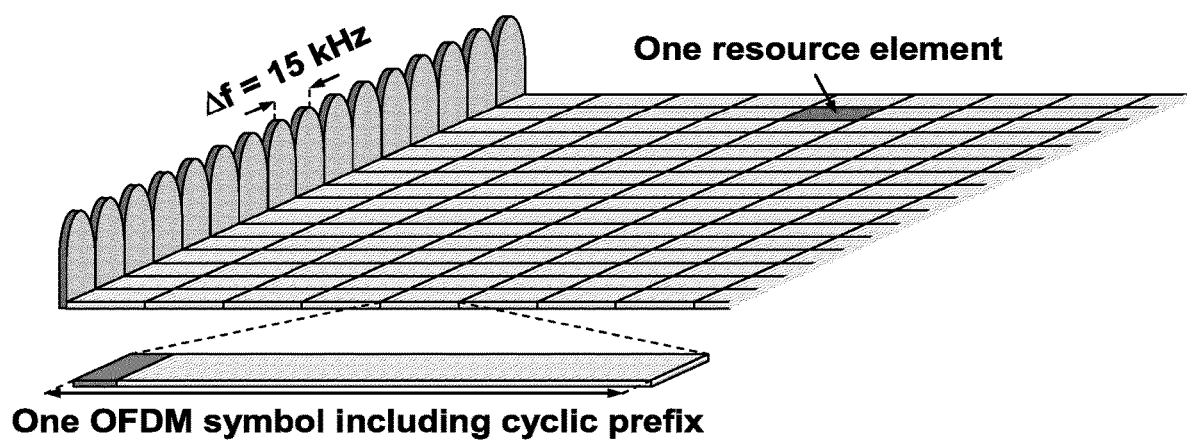
FIG. 1 is a diagram showing a plurality of resource elements for NR transmission.
Figure 2:
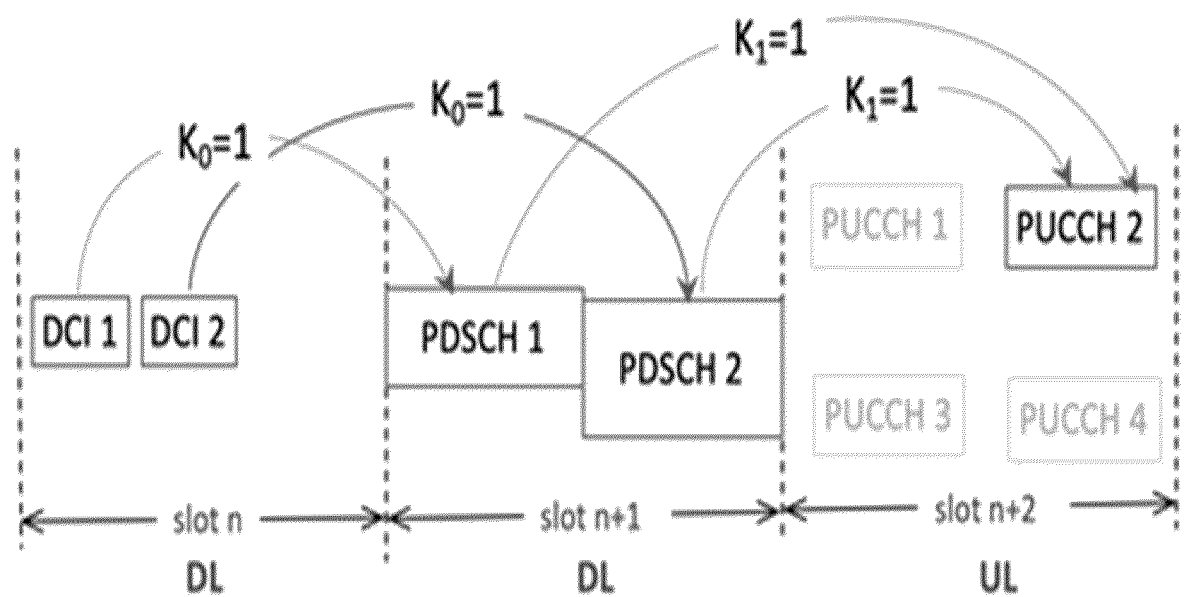
FIG. 2 illustrates a timeline in a scenario with two PDSCHs and one feedback.

Before describing in detail exemplary embodiments, it is noted that the embodiments reside primarily in combinations of apparatus components and processing steps related to uplink control information (UCI) handling for sub-slots. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide uplink control information (UCI) handling for sub-slots. Some embodiments employ scheduling PUCCH transmissions that are longer than a subslot such that no different PUCCH transmissions overlap in time. According to one aspect, a network node is configured to schedule a physical uplink control channel transmission, PUCCH, to span more than one sub-slot of a slot according to at least one rule, such that no different PUCCH transmissions overlap in time. The network node is further configured to transmit the schedule to the WD.

Figure 3:
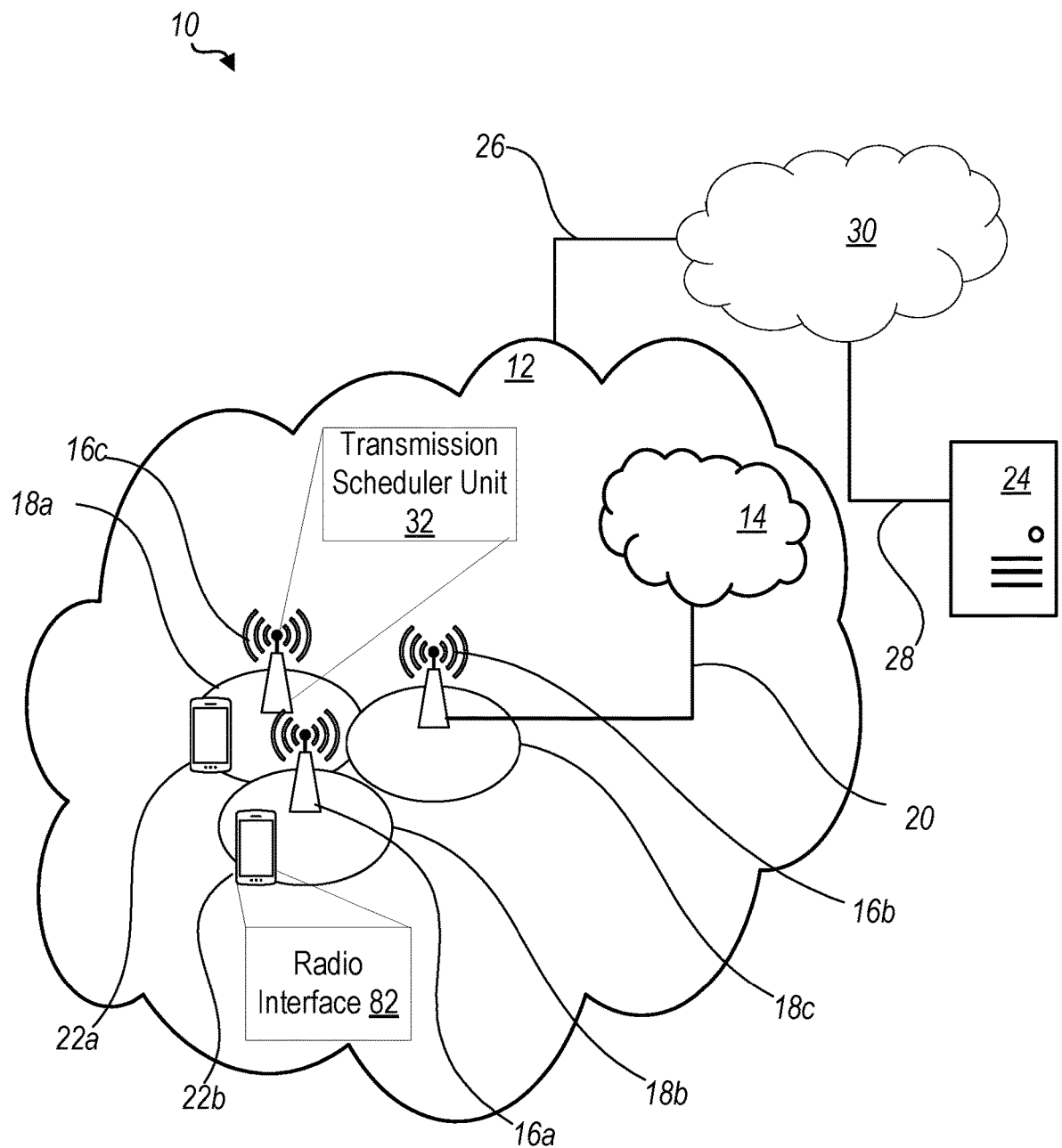
FIG. 3 is a schematic diagram of an exemplary network architecture illustrating a communication system connected via an intermediate network to a host computer according to the principles in the present disclosure.

Returning again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a transmission scheduler unit 32 which is configured to schedule physical uplink control channel, PUCCH, transmissions on a per sub-slot basis. A wireless device 22 is configured to receive an indication of a sub-slot to transmit a physical uplink control channel, PUCCH, transmission.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a transmission scheduler unit 32 which is configured to schedule a physical uplink control channel transmission, PUCCH, to span more than one sub-slot of a slot according to at least one rule, such that no different PUCCH transmissions overlap in time.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a radio interface 82 which is configured to receive a schedule for a physical uplink control channel transmission, PUCCH, to span more than one sub-slot of a slot according to at least one rule, such that no different PUCCH transmissions overlap in time.

Figure 4:
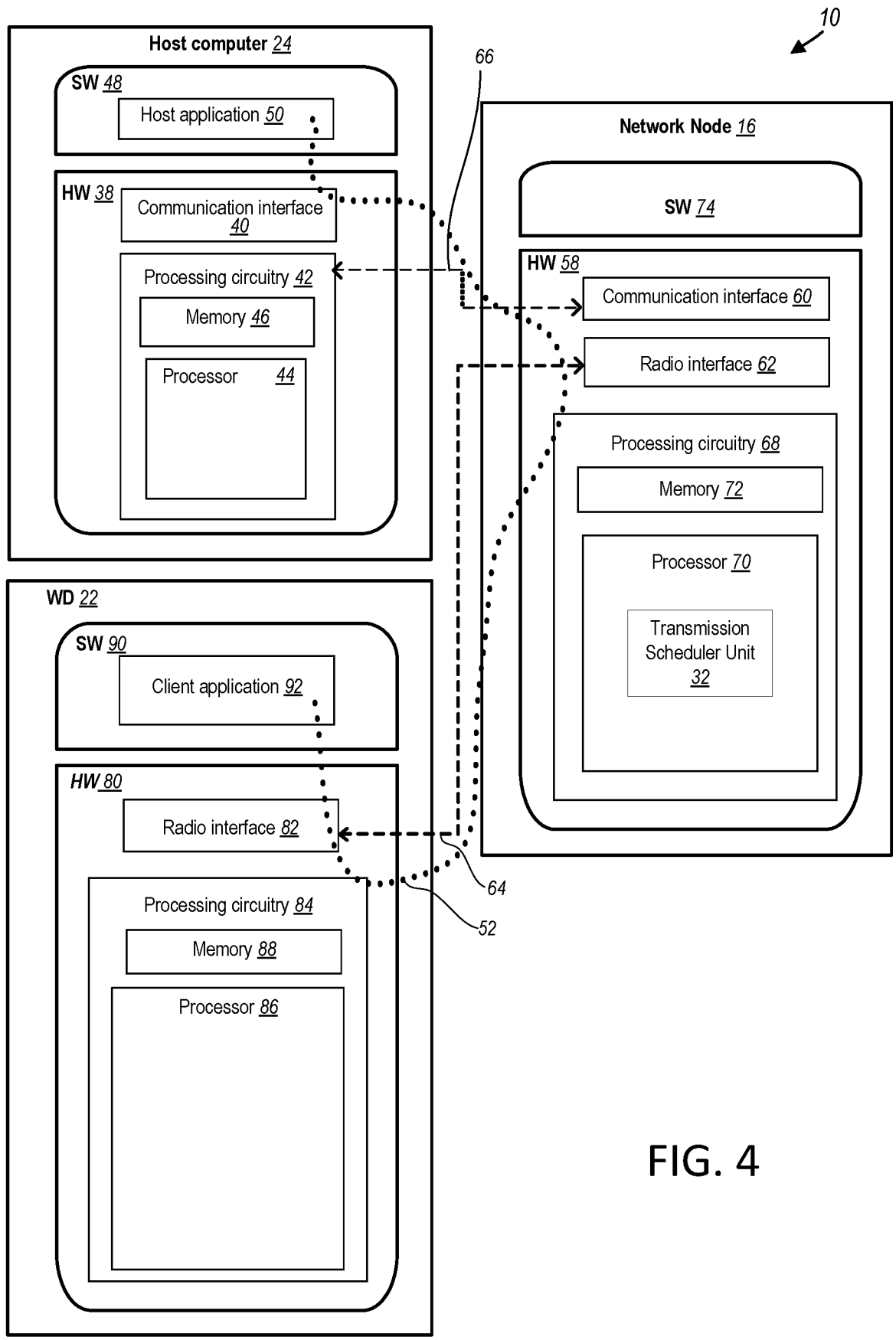
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as transmission scheduler unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
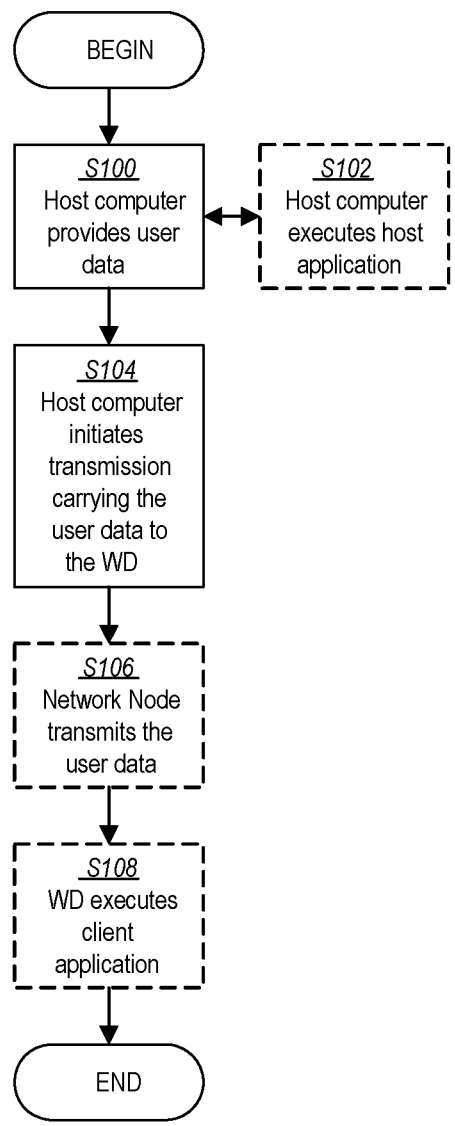
FIG. 5 is a flowchart illustrating exemplary methods implemented in a communication system including a host computer, a network node and a wireless device for executing a client application at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 6:
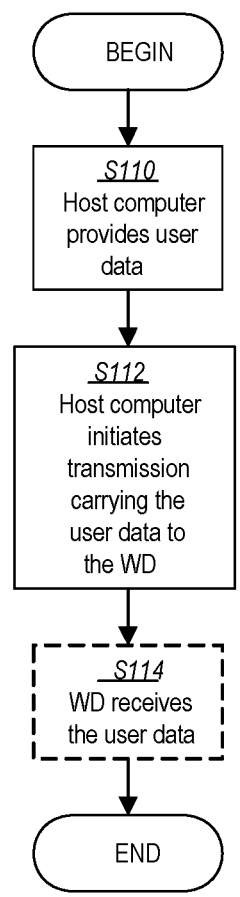
FIG. 6 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
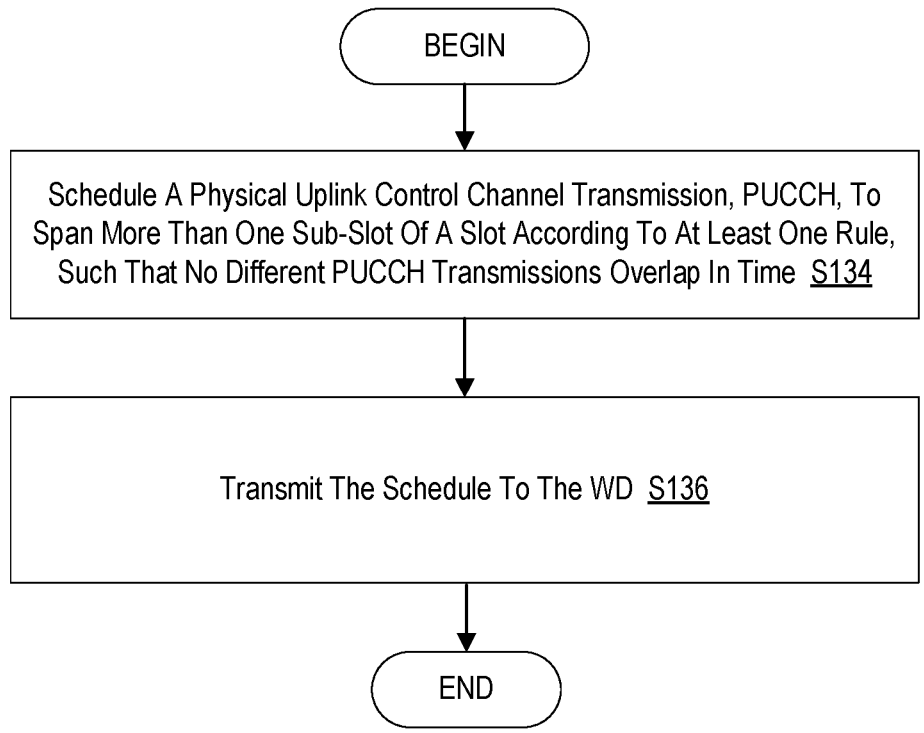
FIG. 9 is a flowchart of an exemplary process in a network node according to some embodiments of the present disclosure.

FIG. 9 is a flowchart of an exemplary process in a network node 16 according to embodiments described herein. One or more blocks described herein may be performed by one or more elements of network node 16 such as by one or more of processing circuitry 68 (including the transmission scheduler unit 32), processor 70, radio interface 62 and/or communication interface 60. Network node 16 such as via processing circuitry 68 and/or processor 70 and/or radio interface 62 and/or communication interface 60 is configured to schedule a physical uplink control channel transmission, PUCCH, to span more than one sub-slot of a slot according to at least one rule, such that no different PUCCH transmissions overlap in time (Block S134). The process further includes causing transmission of the schedule to the WD (Block S136).

Figure 10:
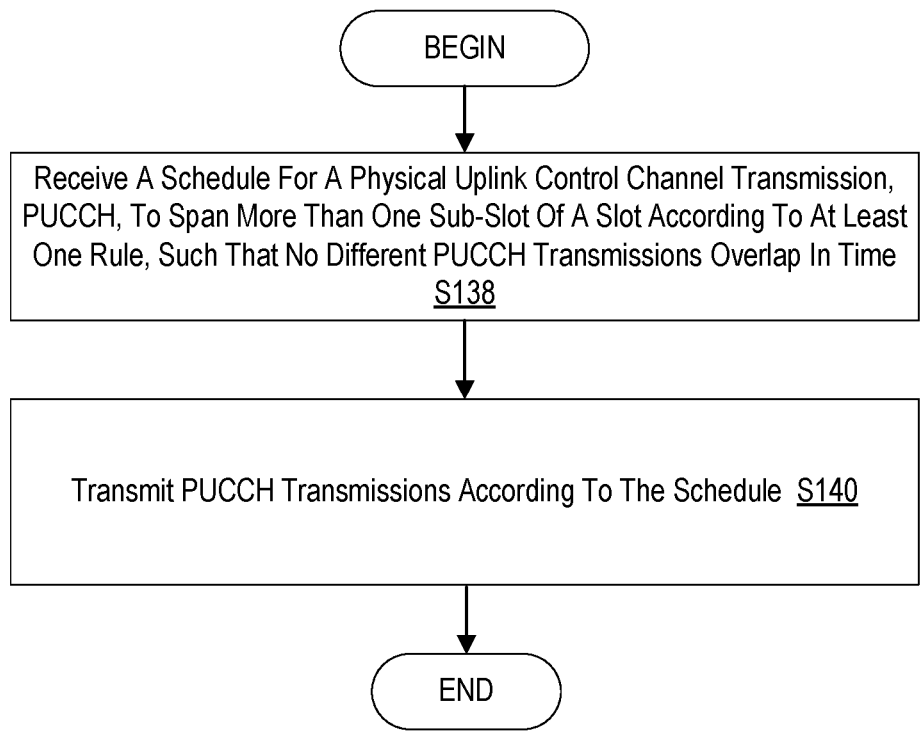
FIG. 10 is a flowchart of an exemplary process in a wireless device according to some embodiments of the present disclosure.

FIG. 10 is a flowchart of an exemplary process in a wireless device 22 according to some embodiments of the present disclosure. One or more blocks described herein may be performed by one or more elements of wireless device 22 such as by one or more of processing circuitry 84, processor 86, radio interface 82 and/or communication interface 60. Wireless device 22 such as via processing circuitry 84 and/or processor 86 and/or radio interface 82 is configured to receive a schedule for a physical uplink control channel transmission, PUCCH, to span more than one sub-slot of a slot according to at least one rule, such that no different PUCCH transmissions overlap in time (Block S138). The process also includes transmitting PUCCH transmissions according to the schedule (Block S140).

Figure 11:
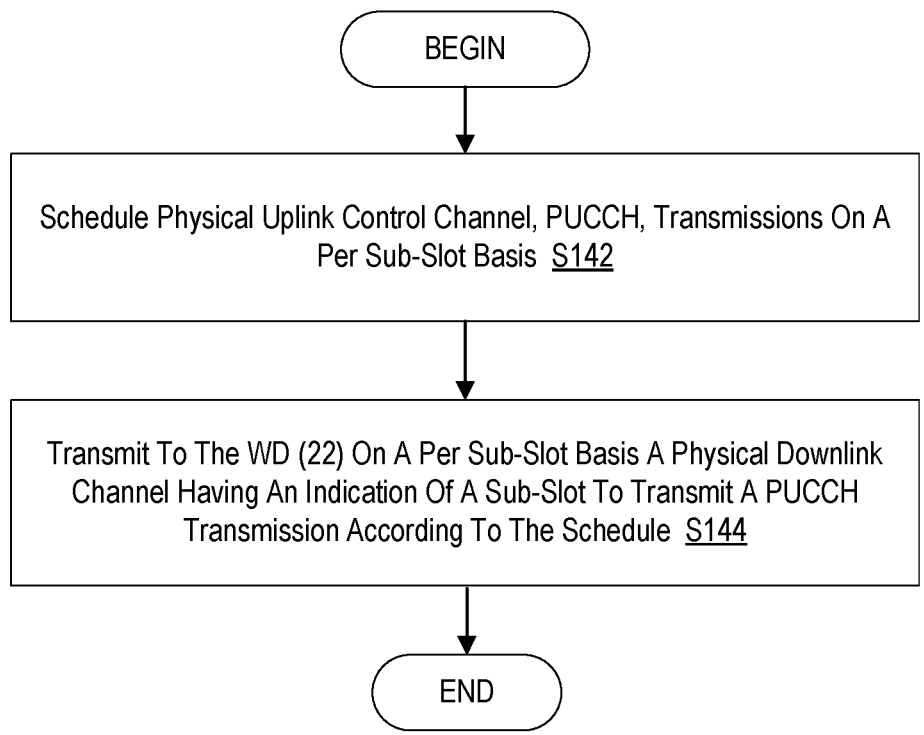
FIG. 11 is a flowchart of an alternative exemplary process in a network node for uplink control information (UCI) handling for sub-slots according to principles set forth herein.

FIG. 11 is a flowchart of an exemplary process in a network node 16 according to principles set forth herein. One or more blocks described herein may be performed by one or more elements of network node 16 such as by one or more of processing circuitry 68 (including the transmission scheduler unit 32), processor 70, radio interface 62 and/or communication interface 60. Network node 16 such as via processing circuitry 68 and/or processor 70 and/or radio interface 62 and/or communication interface 60 is configured to schedule physical uplink control channel, PUCCH, transmissions on a per sub-slot basis (Block S142). The process also includes transmitting to the WD 22 on a per sub-slot basis a physical downlink channel having an indication of a sub-slot to transmit a PUCCH transmission according to the schedule (Block S144).

Figure 12:
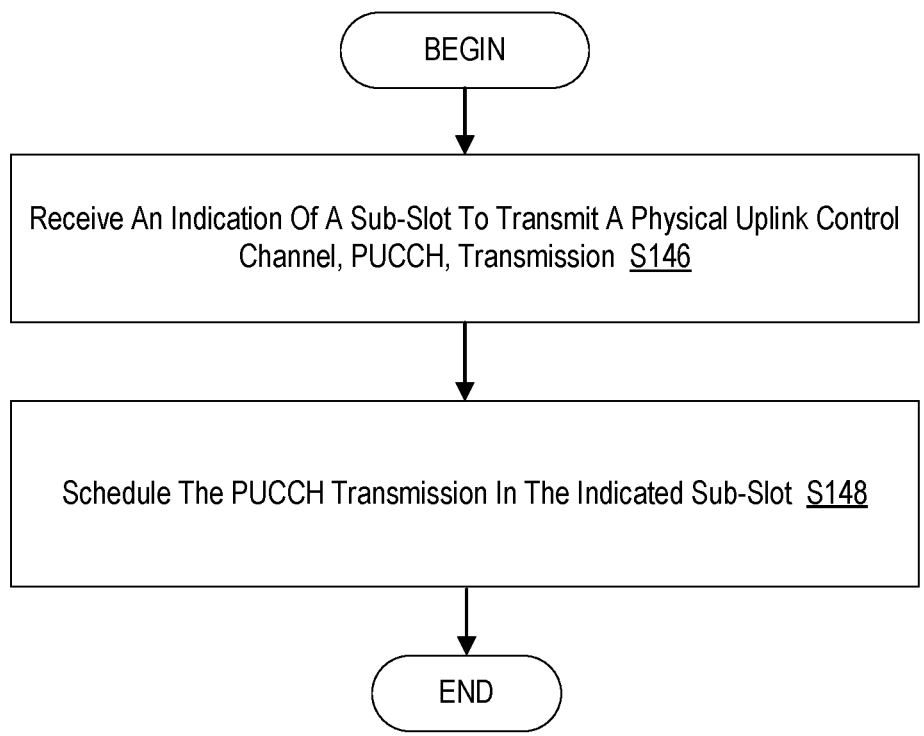
FIG. 12 is a flowchart of an alternative exemplary process in a wireless device for uplink control information (UCI) handling for sub-slots according to principles set forth herein.

FIG. 12 is a flowchart of an exemplary process in a WD 22 according to principles set forth herein. One or more blocks described herein may be performed by one or more elements of wireless device 22 such as by one or more of processing circuitry 84, processor 86, radio interface 82 and/or communication interface 60. Wireless device 22 such as via processing circuitry 84 and/or processor 86 and/or radio interface 82 is configured to receive an indication of a sub-slot to transmit a physical uplink control channel, PUCCH, transmission (Block S146). The process further includes scheduling the PUCCH transmission in the indicated sub-slot (Block S148).

Having described the general process flow of arrangements of the disclosure and having provided examples of hardware and software arrangements for implementing the processes and functions of the disclosure, the sections below provide details and examples of arrangements for uplink control information (UCI) handling for sub-slots.

Figure 13:
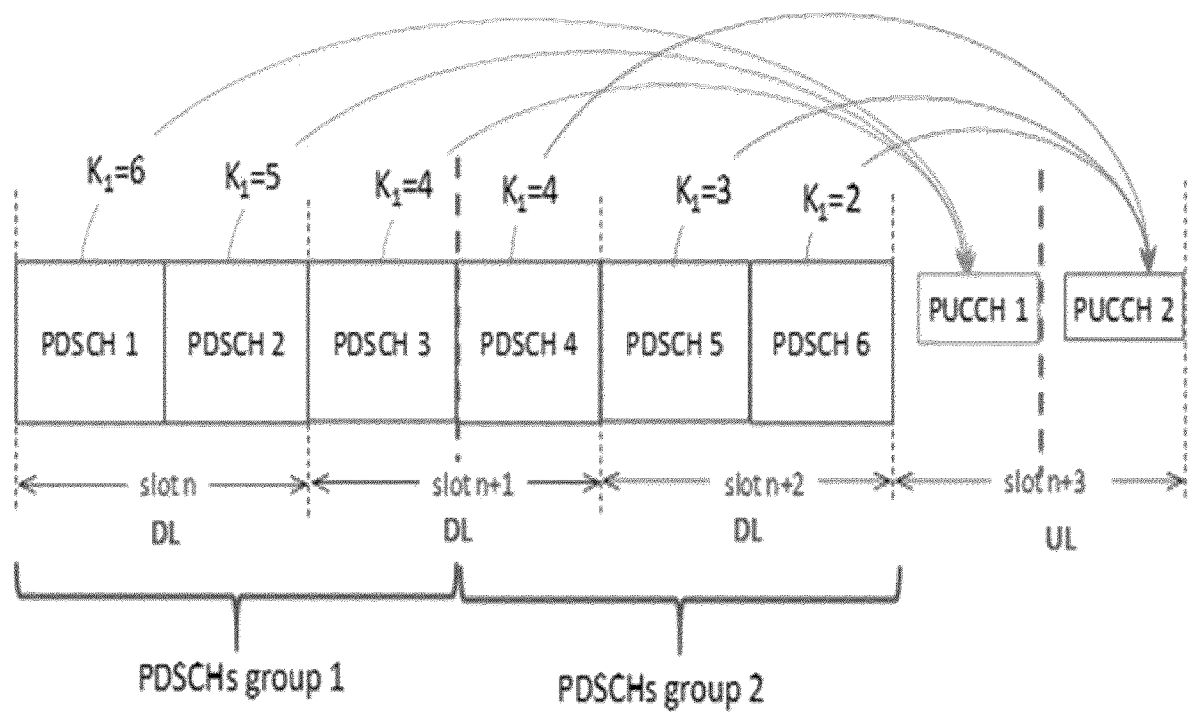
FIG. 13 shows an example where each PDSCH is associated with a certain sub-slot for HARQ feedback.

FIG. 13 shows an example where each PDSCH is associated with a certain sub-slot for HARQ feedback through the use of a K1 value in units of sub-slots.

For power-limited WDs, it may be useful to be able to schedule a longer PUCCH to increase coverage. Thus, it may be useful that a PUCCH transmission be allowed to span more than one sub-slot.

In one embodiment, the WD 22, such as via processing circuitry 84, determines the PUCCH to use based on the UCI payload that is associated with the sub-slot. This payload may exclude UCI corresponding to lower priority traffic, in a UL transmission that is dropped or postponed for other reasons.

In one embodiment, different sub-slots can be associated with different PUCCH resources. In one embodiment, a PUCCH resource associated with a sub-slot is not allowed to occupy OFDM symbols in an earlier sub-slot. In one embodiment, a PUCCH resource associated with a sub-slot is allowed to occupy OFDM symbols in a later sub-slot within the same slot. It is noted that allowing sub-slots to occupy OFDM symbols in later sub-slots can sometimes lead to collisions between scheduled PUCCH transmissions.

In one embodiment, the WD 22 is not expected to be scheduled with PUCCH transmissions starting in different sub-slots that overlap in time. In one embodiment, when two PUCCH transmissions overlap in time, the WD 22 may drop or postpone one of the two transmissions. In one version of this embodiment, when the WD 22 is supposed to drop or postpone the PUCCH transmission that starts earlier, it may only do this if there is enough time between the time when it is supposed to stop transmitting the earlier PUCCH transmission, and when it receives the scheduling that triggers the later PUCCH transmission.

In one embodiment, when two PUCCH transmissions overlap in time, the WD 22 may postpone one of the two transmissions and send the postponed transmission later in time.

In one embodiment, which of the two PUCCH transmissions to drop or postpone may be based on a priority associated with at least one of the two transmissions. The PUCCH transmission with the lowest, or no priority, may be dropped or postponed. In one embodiment, when two PUCCH transmissions overlap, the WD 22 may drop or postpone the earlier scheduled transmission.

In one embodiment, some traffic is scheduled with a K1 value using slots instead of sub-slots. In this case, when determining rules for dropping or postponing due to PUCCH collision, the WD 22 should consider HARQ feedback that is fed back in a slot as belonging to all sub-slots of the slot.

In embodiment, when two PUCCH transmissions overlap in time, the WD 22 multiplexes HARQ-ACK bits and send them in the PUCCH resource corresponding to the PUCCH in the later sub-slot. For example, HARQ-ACK bits of two PUCCHs may be multiplexed and transmitted on a PUCCH resource in sub-slot n+1. The new PUCCH resource can be determined from a PUCCH resource indicator associated with the last DCI scheduling/activating PDSCH with corresponding PUCCH in the later sub-slot. The PUCCH resource indicator points to a PUCCH resource index of a PUCCH resource set which is determined by the number of aggregated HARQ-ACK bits.

In one version of the above embodiment, the WD 22 may multiplex HARQ-ACK information only if there is enough time between the start of the earlier PUCCH transmission, and when it receives the scheduling that triggers the later PUCCH transmission.

In one embodiment, multiplexing of HARQ-ACK bits of two PUCCHs which overlap in time (as in above embodiments) depends on priority associated with the two PUCCH transmissions. For example, multiplexing is done only if the two PUCCH transmissions have the same priority.

In one embodiment, multiplexing of HARQ-ACK bits of two PUCCHs which overlap in time (as in above embodiments) may depend on the type of K1 value of the two PUCCH transmissions, i.e., in units of slot or sub-slot. For example, multiplexing is done only if the two PUCCH transmissions are scheduled with the same unit type for K1 value (e.g., K1 associated with both PUCCHs are in units of sub-slot).

Configuration of PUCCH Resources

In one embodiment, a WD 22 may be configured with separate PUCCH resource sets for each sub-slot in a slot. In one embodiment, a WD 22 may be configured with a common PUCCH resource set for all sub-slots in a slot. In one version of this embodiment, additional sub-slot specific PUCCH resource sets are configured for each sub-slot in a slot. PUCCH resources in the sub-slot specific PUCCH resource sets may or may not be included in the common PUCCH resource set. In one embodiment, some PUCCH resources may be considered invalid when the occupied OFDM symbols of the PUCCH resource spans more than one slot. In another embodiment, PUCCH resources whose occupied OFDM symbols span more than one slot are truncated in time so that they do not cross a slot boundary. In one embodiment, the starting symbol of a PUCCH resource in a slot may be given by the starting symbol configured in the PUCCH resource plus the starting symbol in the slot of the sub-slot for which the resource set is configured. In one embodiment, the starting symbol of a PUCCH resource in a slot may be given by the starting symbol configured in the PUCCH resource plus the starting symbol in the slot of the sub-slot with which the PUCCH transmission is associated, e.g., through the use of a K1 signal.

Thus, some embodiments allow for PUCCH transmissions spanning more than one sub-slot while solving potential collision problems.

According to one aspect, a network node 16 configured to communicate with a wireless device (WD) 22 is provided. The network node 16 includes processing circuitry 68 configured to schedule physical uplink control channel, PUCCH, transmissions on a per sub-slot basis. The network node 16 further includes a radio interface 62 in communication with the processing circuitry 68, the radio interface configured to transmit to the WD 22 on a per sub-slot basis a physical downlink channel having an indication of a sub-slot to transmit a PUCCH transmission according to the schedule.

According to this aspect, in some embodiments, the network node 16 further configures, via the radio interface 62, the WD 22 with a common PUCCH resource set for sub-slots in a slot. In some embodiments, a starting symbol of a PUCCH resource in a slot is given by a starting symbol configured in the PUCCH resource plus a starting symbol in the slot of a sub-slot for which the PUCCH resource set is configured. In some embodiments, the network node 16 further configures, via the radio interface 62 the WD 22 with a different PUCCH resource set for each sub-slot in a slot. In some embodiments, a physical downlink channel transmission includes a K1 value for each sub-slot, the K1 value indicating a number of sub-slots until transmission of a corresponding PUCCH. In some embodiments, multiple sub-slots within a slot provide a K1 value indicating a number of slots until transmission of a same PUCCH in a sub-slot. In some embodiments, the scheduling is performed to prevent a PUCCH resource associated with a sub-slot from occupying orthogonal frequency division multiplexed, OFDM, symbols in an earlier sub-slot.

According to another aspect, a method in a network node 16 configured to communicate with a wireless device (WD) 22 is provided. The method includes scheduling, via the processing circuitry 68, physical uplink control channel, PUCCH, transmissions on a per sub-slot basis, and transmitting, via the radio interface 62, to the WD 22 on a per sub-slot basis a physical downlink channel having an indication of a sub-slot to transmit a PUCCH transmission according to the schedule.

According to this aspect, in some embodiments, the method further includes configuring the WD 22 with a common PUCCH resource set for sub-slots in a slot. In some embodiments, a starting symbol of a PUCCH resource in a slot is given by a starting symbol configured in the PUCCH resource plus a starting symbol in the slot of a sub-slot for which the PUCCH resource set is configured. In some embodiments, the method further includes configuring the WD 22 with a different PUCCH resource set for each sub-slot in a slot. In some embodiments, a physical downlink channel transmission includes a K1 value for each sub-slot, the K1 value indicating a number of sub-slots until transmission of a corresponding PUCCH. In some embodiments, multiple sub-slots within a slot provide a K1 value indicating a number of slots until transmission of a same PUCCH in a sub-slot. In some embodiments, the scheduling is performed to prevent a PUCCH resource associated with a sub-slot from occupying orthogonal frequency division multiplexed, OFDM, symbols in an earlier sub-slot.

According to yet another aspect, a WD 22 configured to communicate with a network node 16 is provided. The WD 22 includes a radio interface 82 configured to receive an indication of a sub-slot to transmit a physical uplink control channel, PUCCH, transmission. The WD 22 also includes a processing circuitry 84 in communication with the radio interface, the processing circuitry configured to schedule the PUCCH transmission in the indicated sub-slot.

According to this aspect, in some embodiments, a PUCCH transmission is one of dropped and postponed if the PUCCH transmission overlaps in time with another PUCCH transmission. In some embodiments, a PUCCH transmission is one of dropped and postponed based at least in part on a priority of the PUCCH transmission. In some embodiments, the processing circuitry 84 is further configured to, when two PUCCH transmissions overlap in time, multiplex hybrid automatic repeat request, HARQ, bits and schedule the HARQ bits for transmission in a later of the two PUCCH transmissions. In some embodiments, the multiplexing is performed only when enough time exists between a start of an earlier of the two PUCCH transmissions and reception of an indication that triggers the later of the two PUCCH transmissions. In some embodiments, the multiplexing is performed only when the two PUCCH transmissions have a same priority. In some embodiments, the multiplexing is performed only when the two PUCCH transmissions are scheduled with a same type of K1 value indicating a sub-slot for PUCCH transmission. In some embodiments, a PUCCH resource is considered invalid when an occupied orthogonal frequency division multiplexed (OFDM) symbol of the PUCCH resource spans more than one slot. In some embodiments, a PUCCH resource whose orthogonal frequency division multiplexed (OFDM) symbol spans more than one slot is truncated in time. In some embodiments, a starting symbol of a PUCCH resource in a slot is given by a starting symbol configured in the PUCCH resource plus a starting symbol in the slot of the sub-slot for which the PUCCH resource is configured. In some embodiments, a starting symbol of a PUCCH resource in a slot is given by a starting symbol configured in the PUCCH resource plus a starting symbol in the slot of the sub-slot with which the PUCCH transmission is associated.

According to another aspect, a method in a wireless device (WD) 22 configured to communicate with a network node 16 is provided. The method includes receiving, via the radio interface 82, an indication of a sub-slot to transmit a physical uplink control channel, PUCCH, transmission, and scheduling, via the processing circuitry 84, the PUCCH transmission in the indicated sub-slot.

According to this aspect, in some embodiments, a PUCCH transmission is one of dropped and postponed if the PUCCH transmission overlaps in time with another PUCCH transmission. In some embodiments, a PUCCH transmission is one of dropped and postponed based at least in part on a priority of the PUCCH transmission. In some embodiments, the method further includes, when two PUCCH transmissions overlap in time, multiplexing, via the processing circuitry 84, hybrid automatic repeat request, HARQ, bits and schedule the HARQ bits for transmission in a later of the two PUCCH transmissions. In some embodiments, the multiplexing is performed only when enough time exists between a start of an earlier of the two PUCCH transmissions and reception of an indication that triggers the later of the two PUCCH transmissions. In some embodiments, the multiplexing is performed only when the two PUCCH transmissions have a same priority. In some embodiments, the multiplexing is performed only when the two PUCCH transmissions are scheduled with a same type of K1 value indicating a sub-slot for PUCCH transmission. In some embodiments, a PUCCH resource is considered invalid when an occupied orthogonal frequency division multiplexed (OFDM) symbol of the PUCCH resource spans more than one slot. In some embodiments, a PUCCH resource whose orthogonal frequency division multiplexed (OFDM) symbol spans more than one slot is truncated in time. In some embodiments, a starting symbol of a PUCCH resource in a slot is given by a starting symbol configured in the PUCCH resource plus a starting symbol in the slot of the sub-slot for which the PUCCH resource is configured. In some embodiments, a starting symbol of a PUCCH resource in a slot is given by a starting symbol configured in the PUCCH resource plus a starting symbol in the slot of the sub-slot with which the PUCCH transmission is associated.

According to one aspect, a network node 16 configured to communicate with a wireless device (WD) 22 is provided. The network node includes processing circuitry 68 configured to schedule a physical uplink control channel transmission, PUCCH, to span more than one sub-slot of a slot according to at least one rule, such that no different PUCCH transmissions overlap in time. The processing circuitry 68 is further configured to cause transmission of the schedule to the WD 22.

According to this aspect, in some embodiments, a PUCCH transmission is dropped or postponed if the PUCCH transmission overlaps in time with another PUCCH transmission. In some embodiments, when PUCCH transmissions overlap in time, an earlier one of the PUCHH transmissions is dropped or postponed.

According to another aspect, a method in a network node 16 is provided. The method includes scheduling a physical uplink control channel transmission, PUCCH, to span more than one sub-slot of a slot according to at least one rule, such that no different PUCCH transmissions overlap in time. The method also includes transmitting the schedule to a wireless device, WD 22.

According to this aspect, in some embodiments, a PUCCH transmission is dropped or postponed if the PUCCH transmission overlaps in time with another PUCCH transmission. In some embodiments, when PUCCH transmissions overlap in time, an earlier one of the PUCHH transmissions is dropped or postponed.

According to yet another aspect, a WD 22 configured to communicate with a network node includes a radio interface 82 and processing circuitry 84 configured to receive a schedule for a physical uplink control channel transmission, PUCCH, to span more than one sub-slot of a slot according to at least one rule, such that no different PUCCH transmissions overlap in time. The radio interface 82 is further configured to transmit PUCCH transmissions according to the schedule.

According to this aspect, in some embodiments, a PUCCH transmission is dropped or postponed if the PUCCH transmission overlaps in time with another PUCCH transmission. In some embodiments, when PUCCH transmissions overlap in time, an earlier one of the PUCHH transmissions is dropped or postponed.

According to another aspect, a method implemented in a wireless device (WD) 22 is provided. The method includes receiving a schedule for a physical uplink control channel transmission, PUCCH, to span more than one sub-slot of a slot according to at least one rule, such that no different PUCCH transmissions overlap in time. The method includes transmitting PUCCH transmissions according to the schedule.

According to this aspect, in some embodiments, a PUCCH transmission is dropped or postponed if the PUCCH transmission overlaps in time with another PUCCH transmission. In some embodiments, when PUCCH transmissions overlap in time, an earlier one of the PUCHH transmissions is dropped or postponed.

Some embodiments include the following:

Embodiment A1. A network node configured to communicate with a wireless device (WD), the network node configured to, and/or comprising a radio interface and/or comprising processing circuitry configured to:
schedule a physical uplink control channel transmission, PUCCH, to span more than one sub-slot of a slot according to at least one rule, such that no different PUCCH transmissions overlap in time; and
transmit the schedule to the WD.

Embodiment A2. The network node of Embodiment A1, wherein a PUCCH transmission is dropped or postponed if the PUCCH transmission overlaps in time with another PUCCH transmission.

Embodiment A3. The network node of Embodiment A1, wherein, when PUCCH transmissions overlap in time, an earlier one of the PUCHH transmissions is dropped or postponed.

Embodiment B1. A method implemented in a network node, the method comprising:
scheduling a physical uplink control channel transmission, PUCCH, to span more than one sub-slot of a slot according to at least one rule, such that no different PUCCH transmissions overlap in time; and
transmitting the schedule to a wireless device, WD.

Embodiment B2. The method of Embodiment B1, wherein a PUCCH transmission is dropped or postponed if the PUCCH transmission overlaps in time with another PUCCH transmission.

Embodiment B3. The method of Embodiment B1, wherein, when PUCCH transmissions overlap in time, an earlier one of the PUCHH transmissions is dropped or postponed.

Embodiment C1. A wireless device (WD) configured to communicate with a network node, the WD configured to, and/or comprising a radio interface and/or processing circuitry configured to:
receive a schedule for a physical uplink control channel transmission, PUCCH, to span more than one sub-slot of a slot according to at least one rule, such that no different PUCCH transmissions overlap in time; and
transmit PUCCH transmissions according to the schedule.

Embodiment C2. The WD of Embodiment C1, wherein a PUCCH transmission is dropped or postponed if the PUCCH transmission overlaps in time with another PUCCH transmission.

Embodiment C3. The WD of Embodiment C1, wherein, when PUCCH transmissions overlap in time, an earlier one of the PUCHH transmissions is dropped or postponed.

Embodiment D1. A method implemented in a wireless device (WD), the method comprising:
receiving a schedule for a physical uplink control channel transmission, PUCCH, to span more than one sub-slot of a slot according to at least one rule, such that no different PUCCH transmissions overlap in time; and
transmitting PUCCH transmissions according to the schedule.

Embodiment D2. The method of Embodiment D1, wherein a PUCCH transmission is dropped or postponed if the PUCCH transmission overlaps in time with another PUCCH transmission.

Embodiment D3. The method of Embodiment D1, wherein, when PUCCH transmissions overlap in time, an earlier one of the PUCHH transmissions is dropped or postponed.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device (WD) configured to communicate with a network node, the WD comprising:
   a radio interface configured to receive an indication of a sub-slot to transmit a physical uplink control channel, PUCCH, transmission, a physical downlink channel reception includes a K1 value for each sub-slot, the K1 value indicating a number of sub-slots until transmission of the corresponding PUCCH; and
   a processing circuitry in communication with the radio interface, the processing circuitry configured to schedule the PUCCH transmission in the indicated sub-slot by multiplexing of hybrid automatic repeat request acknowledgement, HARQ-ACK, bits of two PUCCHs which overlap in time depending on the type of K1 value of the two PUCCH transmissions in units of slot or sub-slot, the multiplexing being done only in response to the two PUCCH transmissions being scheduled with the same unit type for K1 value.

2. The WD of claim 1, wherein a PUCCH transmission is one of dropped and postponed in response to the PUCCH transmission overlapping in time with another PUCCH transmission.

3. The WD of claim 2, wherein a PUCCH transmission is one of dropped and postponed based at least in part on a priority of the PUCCH transmission.

4. The WD of claim 1, wherein the processing circuitry is further configured to, when two PUCCH transmissions overlap in time, multiplex hybrid automatic repeat request, HARQ, bits and schedule the HARQ bits for transmission in a later of the two PUCCH transmissions.

5. The WD of claim 1, wherein the multiplexing is performed only when enough time exists between a start of an earlier of the two PUCCH transmissions and reception of an indication that triggers the later of the two PUCCH transmissions.

6. The WD of claim 1, wherein the multiplexing is performed only when the two PUCCH transmissions have a same priority.

7. The WD of claim 1, wherein a PUCCH resource is considered invalid when an occupied orthogonal frequency division multiplexed (OFDM) symbol of the PUCCH resource spans more than one slot.

8. The WD of claim 1, wherein a PUCCH resource whose orthogonal frequency division multiplexed (OFDM) symbol spans more than one slot is truncated in time.

9. The WD of claim 1, wherein a starting symbol of a PUCCH resource in a slot is given by a starting symbol configured in the PUCCH resource plus a starting symbol in the slot of the sub-slot for which the PUCCH resource is configured.

10. The WD of claim 1, wherein a starting symbol of a PUCCH resource in a slot is given by a starting symbol configured in the PUCCH resource plus a starting symbol in the slot of the sub-slot with which the PUCCH transmission is associated.

11. A method in a wireless device (WD) configured to communicate with a network node, the method comprising:
    receiving an indication of a sub-slot to transmit a physical uplink control channel, PUCCH, transmission, a physical downlink channel reception including a K1 value for each sub-slot, the K1 value indicating a number of sub-slots until transmission of the corresponding PUCCH; and
    scheduling the PUCCH transmission in the indicated sub-slot by multiplexing of hybrid automatic repeat request acknowledgement, HARQ-ACK, bits of two PUCCHs which overlap in time depending on the type of K1 value of the two PUCCH transmissions in units of slot or sub-slot, the multiplexing being done only in response to the two PUCCH transmissions being scheduled with the same unit type for K1 value.

12. The method of claim 11, wherein a PUCCH transmission is one of dropped and postponed in response to the PUCCH transmission overlapping in time with another PUCCH transmission.

13. The method of claim 12, wherein a PUCCH transmission is one of dropped and postponed based at least in part on a priority of the PUCCH transmission.

14. The method of claim 11, further comprising, when two PUCCH transmissions overlap in time, multiplexing hybrid automatic repeat request, HARQ, bits and schedule the HARQ bits for transmission in a later of the two PUCCH transmissions.

15. The method of claim 11, wherein the multiplexing is performed only when enough time exists between a start of an earlier of the two PUCCH transmissions and reception of an indication that triggers the later of the two PUCCH transmissions.

16. The method of claim 11, wherein the multiplexing is performed only when the two PUCCH transmissions have a same priority.

17. The method of claim 11, wherein a PUCCH resource is considered invalid when an occupied orthogonal frequency division multiplexed OFDM, symbol of the PUCCH resource spans more than one slot.

18. The method of claim 11, wherein a PUCCH resource whose orthogonal frequency division multiplexed OFDM, symbol spans more than one slot is truncated in time.

19. The method of claim 11, wherein a starting symbol of a PUCCH resource in a slot is given by a starting symbol configured in the PUCCH resource plus a starting symbol in the slot of the sub-slot for which the PUCCH resource is configured.

20. The method of claim 11, wherein a starting symbol of a PUCCH resource in a slot is given by a starting symbol configured in the PUCCH resource plus a starting symbol in the slot of the sub-slot with which the PUCCH transmission is associated.

* * * * *